United States Patent
Kitamura

(10) Patent No.: US 8,800,028 B2
(45) Date of Patent: Aug. 5, 2014

(54) IMAGE FORMING APPARATUS THAT PREVENTS UNAUTHORIZED USE

(75) Inventor: Hiroto Kitamura, Fukushima (JP)

(73) Assignee: Oki Data Corporation, Tokyo (JP)

(*) Notice: Subject to any disclaimer, the term of this patent is extended or adjusted under 35 U.S.C. 154(b) by 1216 days.

(21) Appl. No.: 11/840,247

(22) Filed: Aug. 17, 2007

(65) Prior Publication Data

US 2008/0047002 A1   Feb. 21, 2008

(30) Foreign Application Priority Data

Aug. 18, 2006  (JP) .................................. 2006-223129

(51) Int. Cl.
| | | |
|---|---|---|
| G06F 7/04 | (2006.01) | |
| G06F 12/00 | (2006.01) | |
| G06F 12/14 | (2006.01) | |
| G06F 13/00 | (2006.01) | |
| G06F 17/30 | (2006.01) | |
| G11C 7/00 | (2006.01) | |
| H04N 7/16 | (2011.01) | |
| G06F 3/12 | (2006.01) | |

(52) U.S. Cl.
CPC ............ *G06F 3/1238* (2013.01); *G06F 3/1222* (2013.01); *G06F 3/1262* (2013.01); *G06F 3/1263* (2013.01); *G06F 3/1284* (2013.01)
USPC .............................................. 726/19; 726/28

(58) Field of Classification Search
CPC ... G06F 21/608; G06F 3/1222; G06F 3/1238; G06F 3/126; G06F 3/1262; G06F 3/1263
See application file for complete search history.

(56) References Cited

U.S. PATENT DOCUMENTS

| | | | |
|---|---|---|---|
| 2005/0204158 A1* | 9/2005 | Tobe | 713/200 |
| 2006/0050297 A1 | 3/2006 | Morikawa et al. | |
| 2006/0104656 A1* | 5/2006 | Tomita et al. | 399/80 |
| 2006/0136992 A1* | 6/2006 | Shigeeda | 726/2 |
| 2006/0285156 A1* | 12/2006 | Kashiwagi | 358/1.15 |
| 2007/0006234 A1* | 1/2007 | Ogata | 718/101 |
| 2007/0014442 A1* | 1/2007 | Yu | 382/124 |
| 2007/0127061 A1* | 6/2007 | Itagaki | 358/1.15 |
| 2007/0177185 A1* | 8/2007 | Ogura et al. | 358/1.14 |

FOREIGN PATENT DOCUMENTS

| | | |
|---|---|---|
| JP | 07168787 A | 7/1995 |
| JP | 9179449 A | 7/1997 |
| JP | 2004-213072 A | 7/2004 |
| JP | 2004-249625 A | 9/2004 |
| JP | 2005-346366 A | 12/2005 |
| JP | 2006-079271 A | 3/2006 |
| JP | 2006-203858 A | 8/2006 |

* cited by examiner

*Primary Examiner* — Philip Chea
*Assistant Examiner* — Trong Nguyen
(74) *Attorney, Agent, or Firm* — Panitch Schwarze Belisario & Nadel LLP

(57) ABSTRACT

An image forming apparatus which performs a log-in through an identification with respect to a user includes a non-volatility memory which previously stores discrimination information of the user as registration discrimination information. A discrimination information obtaining section obtains an identified discrimination information from the user. An identifying section compares the identified discrimination information and the registration discrimination information to determine whether the identification is authenticated. An inputting section which receives a process request input by the user. A process executing section executes the process request from the inputting section. A log-in section logs in for the user when the identification is authenticated. A log-out processing section logs out following an end of the input of the process request. The process executing section executes the requested process together with log-out.

10 Claims, 10 Drawing Sheets

| CODE NUMBER |
|---|
| 1000 |
| 1001 |
| 1002 |
| 1003 |

| PROCESS NAME | PROCESS SETTING |
|---|---|
| COPY | RESPECTIVE SETTINGS OF COPY |
| COPY | RESPECTIVE SETTINGS OF COPY |
| SCAN | RESPECTIVE SETTINGS OF SCAN |
| FACSIMILE | RESPECTIVE SETTINGS OF FACSIMILE |

*FIG. 5*

| CODE NUMBER | UNEXECUTED PROCESS No. |
|---|---|
| 1000 | 1 |
| 1001 | -- |
| 1002 | 2 |
| 1003 | 3 |

*FIG. 10*

| PROCESS No. | PROCESS NAME | PROCESS SETTING |
|---|---|---|
| 1 | COPY | RESPECTIVE SETTINGS OF COPY |
| 1 | SCAN | RESPECTIVE SETTINGS OF SCAN |
| 2 | FACSIMILE | RESPECTIVE SETTINGS OF FACSIMILE |
| 2 | SCAN | RESPECTIVE SETTINGS OF SCAN |
| 3 | COPY | RESPECTIVE SETTINGS OF COPY |
| 3 | COPY | RESPECTIVE SETTINGS OF COPY |

*FIG. 11*

IMAGE FORMING APPARATUS THAT PREVENTS UNAUTHORIZED USE

BACKGROUND OF THE INVENTION

1. Field of the Invention

The invention relates to an image forming apparatus which automatically logs out after executed a process selected by user who is identified.

2. Related Background Art

Conventionally, in the case to execute a process using a code number in a multiple apparatus, user inputs a his/her own code number to the multiple apparatus. The multiple apparatus judges whether the inputted code number has been registered or not, and only identifies the user if the code number is judged being registered, then logs in so as to allow the execution of the process. The identified user makes the process start. When the process ends, the multiple apparatus displays an initial scene on a displaying section, then the user requests to log out through a log-out switch on the displaying section. Further, when a predetermined wait time passes from a last panel operation, the multiple apparatus decides a log-out and makes the process end. Here, the wait time is a time to keep the log-in state continuing from that a predetermined process ends to that a process following later begins. It may refer to patent document 1.

Patent document 1: Japan patent publication 2004-249625.

However, in the above-stated method, there is such problem to be solved, that is, in the case that the user leaves there without logging out during the wait time passes after the predetermined process specified by the user ended, other user except the identified user may poses as the identified user to start the process following later (requested by the other user).

SUMMARY OF THE INVENTION

It is, therefore, an object of the invention to provide an image forming apparatus capable of solving the above problem.

According to the present invention, there is provided an image forming apparatus which performs a log-in through an identification with respect to a user, comprising:

a storing section which previously store discrimination information of the user as registration discrimination information;

an discrimination information obtaining section which obtains an identified discrimination information of user who demanded the identification;

an identifying section which judges whether the identification is right or not on the basis of a comparison between the identified discrimination information and the registration discrimination information;

an inputting section which makes user input process request;

a process executing section which executes the process request inputted from the inputting section;

a log-in section which logs in for the user when the identification is right; and a log-out processing section which logs out on the basis of an end of the input of the process request.

Moreover, in the image forming apparatus, the discrimination information may be a password.

Moreover, the image forming apparatus may further comprise a memorizing section which is able to memorize plural image data requested by plural users, wherein the process executing section executes a parallel process of the plural image data requested by user corresponding the log-in.

Moreover, the image forming apparatus may further comprise a collective process selecting section which is able to select the parallel process of the plural image data requested by user or a single process of predetermined image data.

Moreover, in the image forming apparatus, the memorizing section may further have an unexecuted process adding function to additionally add process unexecuted last time.

According to the present invention, there is also provided an image forming apparatus for performing process of image, comprising:

an identifying section for executing an identification;

a process sort inputting section for receiving an input of process sort of image after the identification ended;

a process managing section for storing at least one process sort inputted by the process sort inputting section; and a process executing section for executing process of the process managing section, wherein the identifying section, before the process stored in the process managing section is ended, stops the identification and limits the input of the process sort inputting section.

Moreover, the image forming apparatus may further comprise:

a process instructing section for instructing the process executing section to execute the at least one process sort stored in the process managing section;

a process interruption instructing section for instructing the process executing section to interrupt the at least one process sort stored in the process managing section without executing;

an unexecuted process discrimination symbol assigning section for assigning an unexecuted process discrimination symbol to identification information inputted when performing the identification by making a relation after an interruption instruction is inputted; and a non-volatility memory for storing the process sort stored in the process managing section together with the unexecuted process discrimination symbol, wherein the process managing section, in the case that the identification information inputted by the identifying section is identification information assigned by the unexecuted process discrimination symbol, reads out the process sort assigned by the unexecuted process discrimination symbol from the non-volatility memory and stores the process sort.

The effect of the present invention:

According to the present invention, because the image forming apparatus comprises the log-in section which executes a log-in in the case that the judgment result of the identifying section is right identification, and the log-out processing section which logs out on the basis of an end of the input of the process request after a process execution of image data requested by the user, even if in the case that the user leaves there without logging out during the wait time passes after the predetermined process specified by the user ended, it is impossible that other user except the identified user poses as the identified user to start the process following later (requested by the other user).

The above and other objects and features of the present invention will become apparent from the following detailed description and the appended claims with reference to the accompanying drawings.

BRIEF DESCRIPTION OF THE DRAWINGS

FIG. 4 is a diagram showing a code number management table of embodiment 1;

FIG. 5 is a diagram showing an execution process management table of embodiment 1;

FIG. 10 is a diagram showing a code number management table of embodiment 2;

FIG. 11 is a diagram showing an execution process management table of embodiment 2.

DETAILED DESCRIPTION OF THE PREFERRED EMBODIMENTS

Embodiments of the invention will be described in detail hereinbelow with reference to the drawings.

<Embodiment 1>

Figure 1:
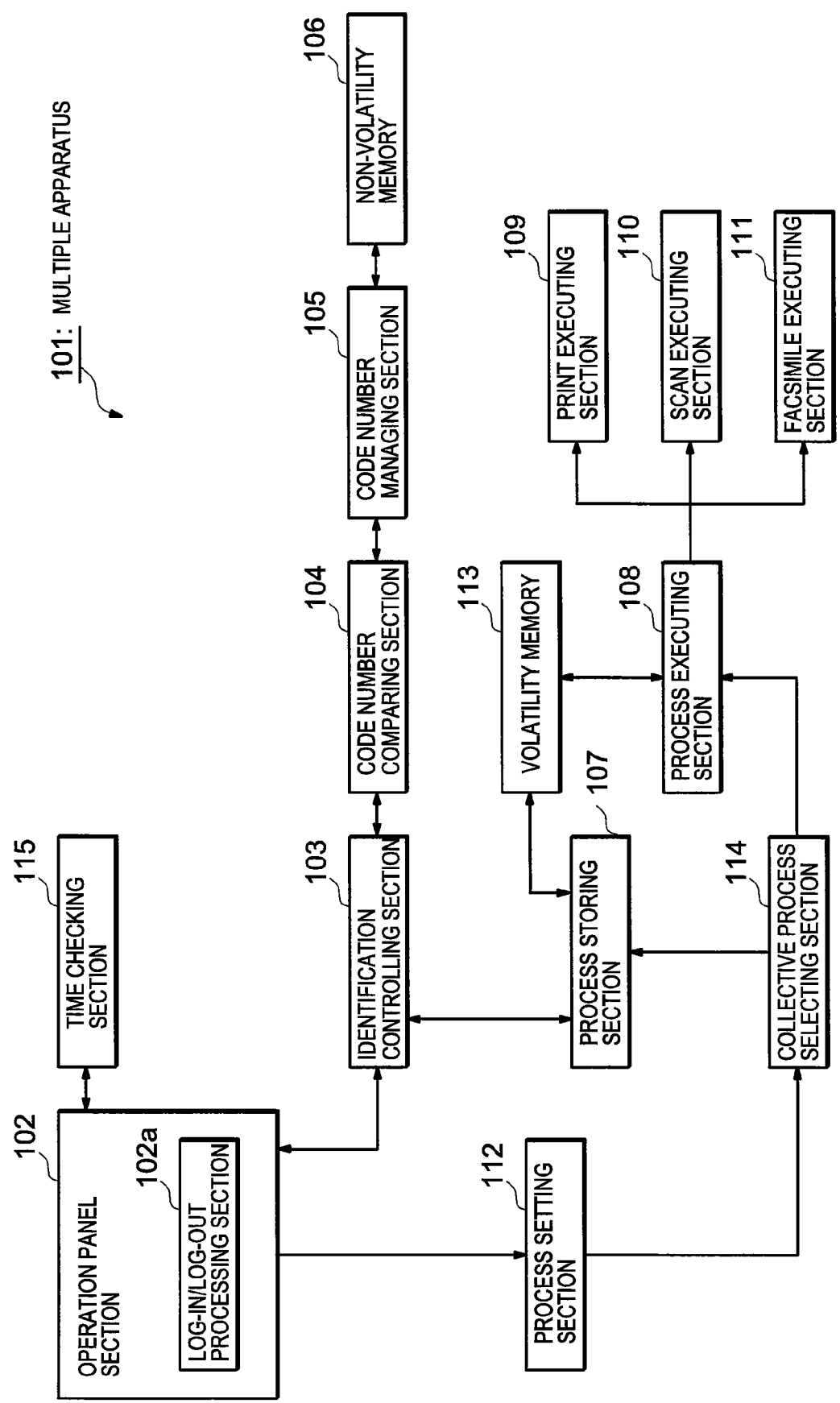
FIG. 1 is a block diagram showing a summary structure of an image forming apparatus (multiple apparatus) of embodiment 1.

FIG. 1 is a block diagram showing a summary structure of an image forming apparatus (multiple apparatus) of embodiment 1.

As shown by FIG. 1, a multiple apparatus 101 of embodiment 1 comprises an operation panel section 102, an identification controlling section 103, a code number comparing section 104, a code number managing section 105, a non-volatility memory 106, a process storing section 107, a process executing section 108, a print executing section 109, a scan executing section 110, a facsimile executing section 111, a process setting section 112, a volatility memory 113, a collective process selecting section 114 and a time measuring section 115.

The operation panel section 102 has a log-in/log-out processing section 102a. The operation panel section 102 is a part to receive settings of respective process or an input of code number performed by user, and to displays predetermined information so as to perform a role of man-to-machine interface between the multiple apparatus 101 and user. Regarding the part, later it will be explained once more in detail through other drawing.

The identification controlling section 103 is a part to control the code number comparing section 104, the code number managing section 105 and the non-volatility memory 106 on the basis of a code number inputted by the user through the operation panel section 102; and to execute a user identification; further to notify the operation panel section 102 of an identification result.

The code number comparing section 104 is a part to judge whether the code number inputted by the user corresponds to a registered code number read out from the non-volatility memory 106 via the code number managing section 105 or not, that is, is a part to judge whether the code number inputted by the user is included in a code number management table (FIG. 4) of the non-volatility memory 106.

The code number managing section 105 is a part to manage code numbers registered in the multiple apparatus 101. In the management, a new registration of identification number toward the non-volatility memory 106 and a read of the registered identification number from the non-volatility memory 106 are included.

The non-volatility memory 106 has a code number management table and is a non-volatility memory to previously store code numbers via the code number managing section 105. Regarding the contents of the code number management table, later it will be explained once more.

The process storing section 107 is a part to, in the case that a collective process is selected by user via the collective process selecting section 114, temporarily store plural process requests (print process, scan process, facsimile process and the like) of user to the volatility memory 113.

The process executing section 108 is a part to make respective executing sections stated below execute process (print process, scan process, facsimile process or the like) selected by user. Here, in the case that user selects collective process through the collective process selecting section 114 (stated below), the process executing section 108 makes the process execute on the basis of a execution process management table (stated below) in the volatility memory 113; further, in the case that user does not select collective process, makes the process execute according to a receiving order.

The print executing section 109 is a part to execute print process. The scan executing section 110 is a part to execute scan process. The facsimile executing section 111 is a part to execute facsimile process.

The process setting section 112 is a part to send process request received from user via the operation panel section 102 to the collective process selecting section 114.

The collective process selecting section 114 demands user to select whether to collective process the process request received from user via the operation panel section 102 or not. If user selects to collective process, the collective process selecting section 114 sends the process request to the process storing section 107; if user does not select to collective process, the collective process selecting section 114 sends the process request to the process executing section 108.

The time measuring section 115 is a timer to measure passage time from a last key operation of user.

Figure 2:
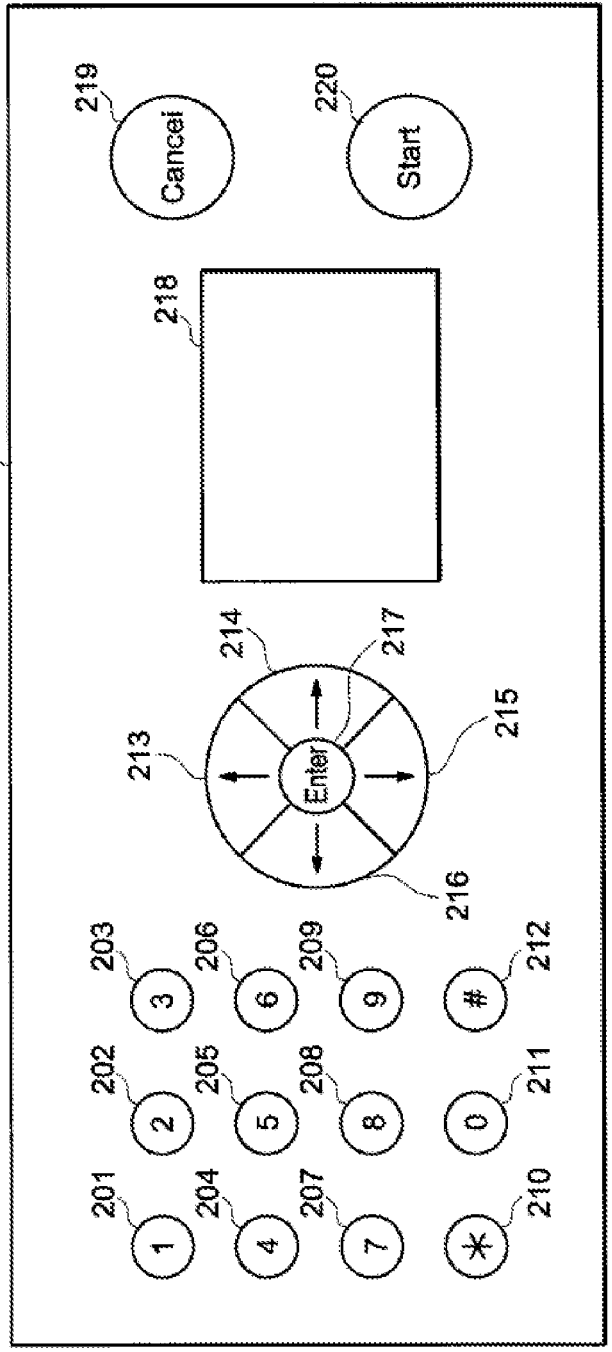
FIG. 2 is an outward diagram showing an operation panel section.

FIG. 2 is an outward diagram showing an operation panel section.

As shown by FIG. 2, the operation panel section 102 includes a button 201 to input "1", a button 202 to input "2", a button 203 to input "3", a button 204 to input "4", a button 205 to input "5", a button 206 to input "6", a button 207 to input "7", a button 208 to input "8", a button 209 to input "9", a button 210 to input "*", a button 211 to input "0", a button 212 to input "#", an upward cursor key 213, a rightward cursor key 214, a downward cursor key 215, a leftward cursor key 216, a Enter key 217 to input a decision, a display scene 218, a button 219 to cancel job and a button 220 to start job.

Figure 3:
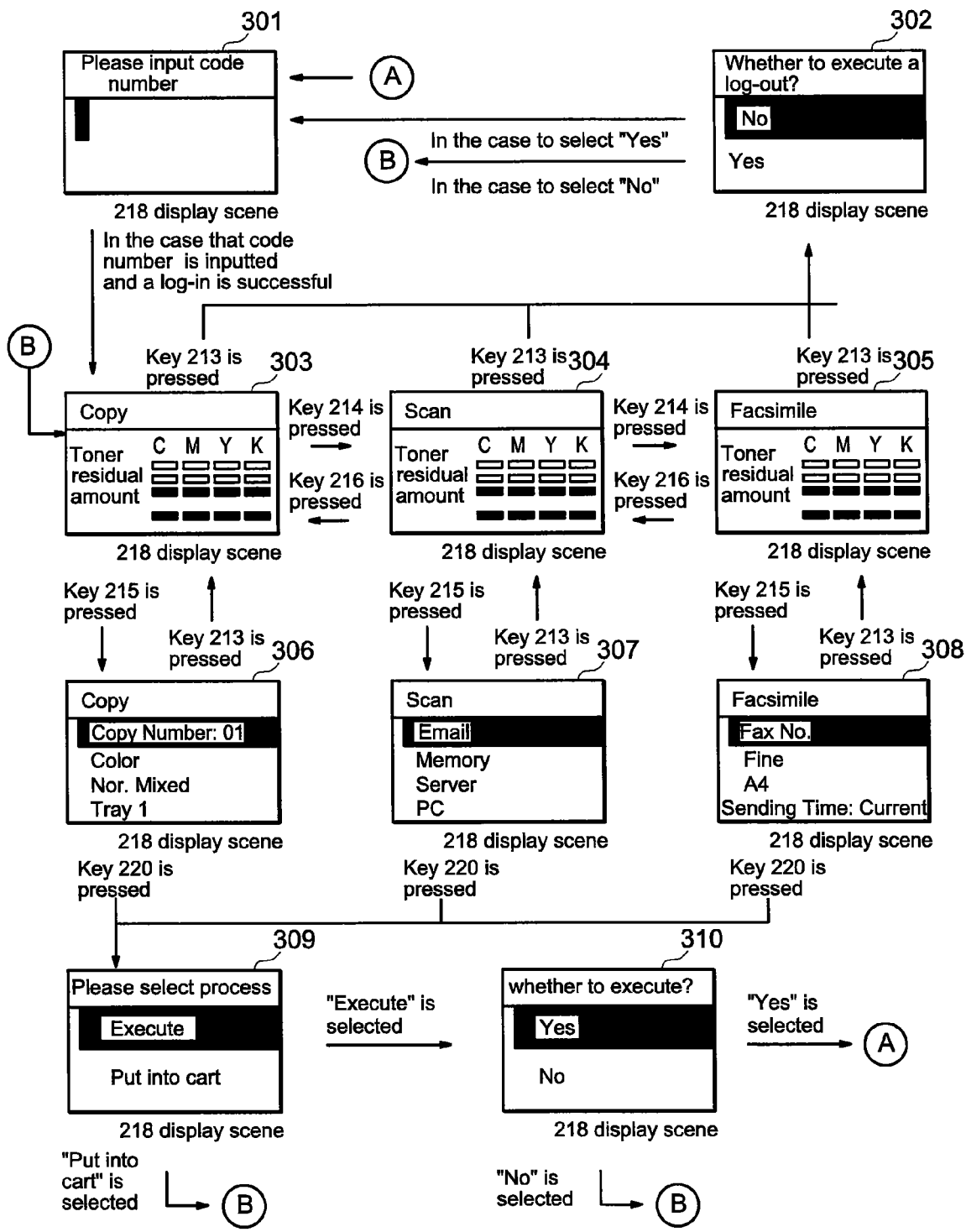
FIG. 3 is an explanation diagram showing a display scene of operation panel section in embodiment 1.

FIG. 3 is an explanation diagram showing a display scene of operation panel section in embodiment 1.

The drawing is to explain content of a scene displayed on the display scene of FIG. 2.

In the drawing, a scene 301 is a code number inputting scene, and it is displayed after power source of the image forming apparatus is turned on. The code number inputting scene is displayed when identifying user who uses the multiple apparatus 101. On the scene, a prompt of "please input code number" is displayed, and when user inputted a code number, "*" is displayed per input of numeral. Here, in the case that user is successful in log-in, a scene 303 is displayed.

A scene 302 is a log-out request scene, it is displayed when asking user about an intention of log-out request with respect to the identified user. In the case to request log-out, the user selects "Yes"; in the case not to request log-out, the user selects "No".

A scene 303 is a copy waiting scene. In the case that user wants to set copy or wants to start copy, the user presses the downward cursor key 215 in the scene 303 so as to make a scene 306 display. The scene 306 is a copy setting scene, it can perform respective settings of copy. Here, as an example, such case is displayed that user sets copy number to be one sheet.

Further, in the case that user wants to execute copy process, the user presses the button 220 (FIG. 2) in the scene 306 so as to make a scene 309 display. In the scene, the user may select "Execute" in the scene for executing the specified process of user; and may select "Put into cart" for specifying plural processes and collectively executing them. Here, when user selects the "Execute", a scene 310 is displayed. When user selects the "Put into cart", the scene 303 is displayed again (it also may move to a scene 304), then, it is possible to specify plural processes, such function is function of the collective process selecting section 114 (FIG. 1) (the below description will be the same).

The scene 310 is a process execution confirmation scene, it is possible to select "Yes" for really executing the specified process and to select "No" for stopping to execute the specified process. Here, when the user selects "Yes", the scene 301 is displayed; when the user selects "No", the scene 303 is displayed, so it is possible to reset print contents. Here, when to press the rightward cursor key 214 (FIG. 2) in the scene 303, a scene 304 is displayed.

The scene 304 is a scan waiting scene. In the case that user wants to set scan or wants to start scan, the user presses the downward cursor key 215 (FIG. 2) in the scene 304 so as to make a scene 307 display. The scene 307 is a scan setting scene, it can perform respective settings of scan. Here, as an example, such case is displayed that user sets an E-mail.

Further, in the case that user wants to execute scan process, the user presses the button 220 (FIG. 2) in the scene 307 so as to make the scene 309 display. In the scene, the user may select "Execute" in the scene for executing the specified process of user; and may select "Put into cart" for specifying plural processes and collectively executing them. Here, when user selects the "Execute", the scene 310 is displayed. When user selects the "Put into cart", the scene 303 is displayed again (it also may move to a scene 305), then, it is possible to specify plural processes.

The scene 305 is a facsimile waiting scene. In the case that user wants to set facsimile or wants to start facsimile, the user presses the downward cursor key 215 (FIG. 2) in the scene 304 so as to make a scene 308 display. The scene 308 is a facsimile setting scene, it can perform respective settings of facsimile. Here, as an example, such case is displayed that user sets a Fax No.

Further, in the case that user wants to execute facsimile process, the user presses the button 220 (FIG. 2) in the scene 308 so as to make the scene 309 display. The scene 309 is a process executing scene, it is displayed when executing process. In the scene, when user selects "Execute", the scene 310 is displayed. When user selects "Put into cart", the scene 303 is displayed again, then, it is possible to specify plural processes.

FIG. 4 is a diagram showing a code number management table of embodiment 1.

As shown by FIG. 4, code number consists of numerals of 4-9 digits, the registration number of the code number may be optionally set by user.

The code number is written into the non-volatility memory 106 (FIG. 1) by the code number managing section 105 (FIG. 1), and is read out from the non-volatility memory 106 (FIG. 1) when confirming the code number in the code number comparing section 104 (FIG. 1).

FIG. 5 is a diagram showing an execution process management table of embodiment 1.

An execution process management table 501 consists of a process name and a process setting. In the execution process management table 501, through the process storing section 107 (FIG. 1), process request specified by user is written; through the process executing section 108, the process request is read out when executing process. In the case that user selects collective process via the collective process selecting section 114 (FIG. 1), the contents of parallel processes and the process order is decided on the basis of the execution process management table 501.

The following is to explain operations of the multiple apparatus 101 in embodiment 1.

Figure 6:
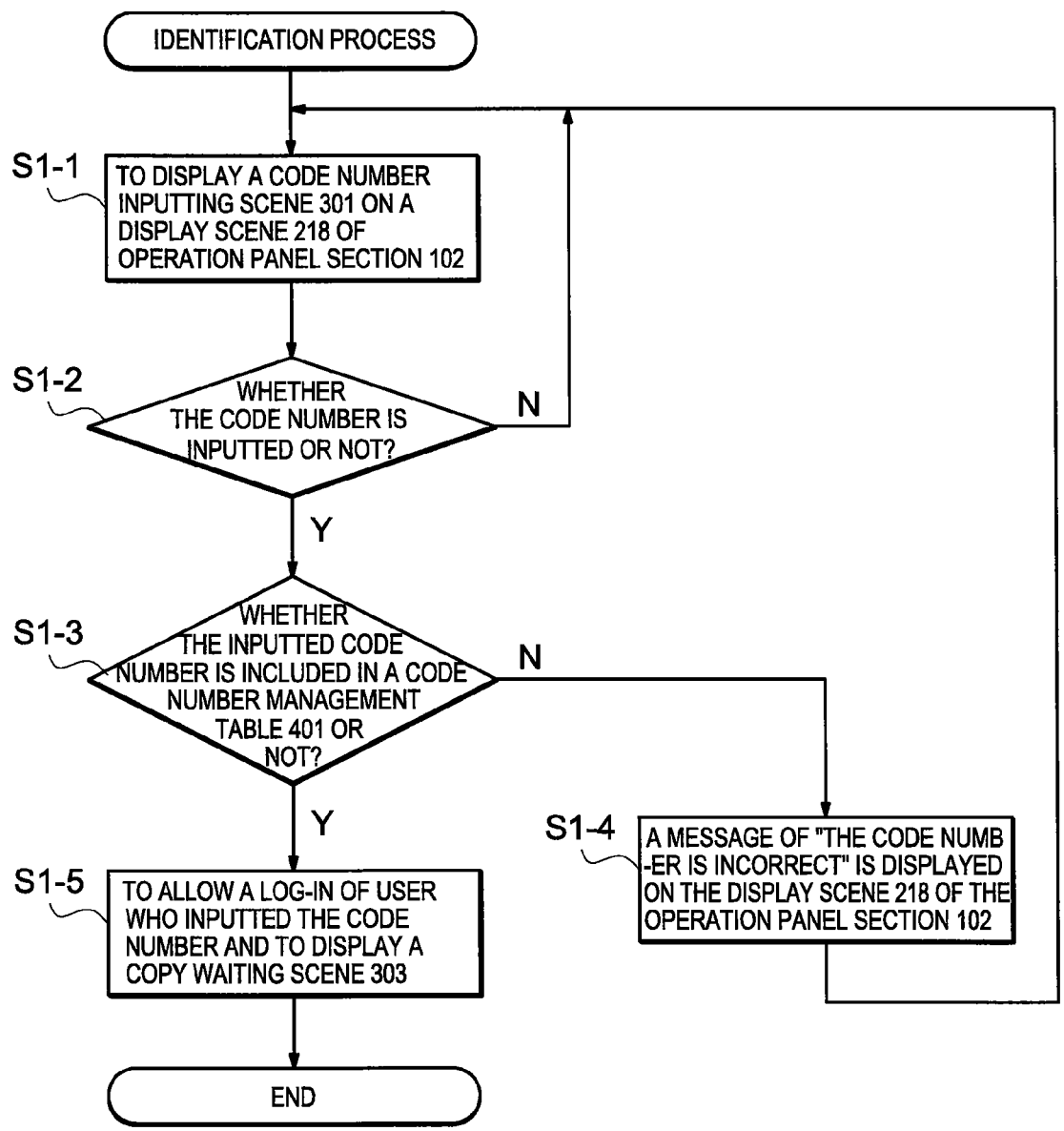
FIG. 6 is a flowchart for explaining an identification process using code number outputted from operation panel section in embodiment 1.

FIG. 6 is a flowchart for explaining an identification process using code number outputted from operation panel section in embodiment 1.

The flowchart shows operations when the identification controlling section 103 (FIG. 1) executes user identification on the basis of code number received from user via the operation panel section 102 (FIG. 1). Regarding the operations of the identification controlling section 103 (FIG. 1), they will be explained according to step order from Step S1-1~S1-5.

Step S1-1

The multiple apparatus 101 (FIG. 1) is protected by code number. On the display scene 218 (FIG. 3) of the operation panel section 102 (FIG. 1), the scene 301 (code number inputting scene) is displayed.

Step S1-2

User uses the button 201, the button 202, the button 203, the button 204, the button 205, the button 206, the button 207, the button 208, the button 209 and the button 211 of the operation panel section 102 (FIG. 2) to input the code number in the scene 301 (FIG. 3), and decides the code number by using the Enter key 217. Until the input of the code number ends, the step S1-1~1-2 are repeated. When the input of the code number ended, the step S1-3 is started.

Step S1-3

The identification controlling section 103 (FIG. 1) controls the code number comparing section 104 (FIG. 1), the code number managing section 105 (FIG. 1) and the non-volatility memory 106 (FIG. 1) to execute a user identification on the basis of the code number inputted by the user through the operation panel section 102 (FIG. 1). The code number comparing section 104 (FIG. 1) judges whether the code number inputted by the user is included in a code number management table (FIG. 4) of the non-volatility memory 106 or not. If it is included, the step S1-5 is started; if it is not included, the step 1-4 is started.

Step S1-4

On the display scene 218 (FIG. 3) of the operation panel section 102 (FIG. 1), a message such as "the code number is incorrect" is displayed. Then, the scene 301 (code number inputting scene) is 10 displayed once more on the display scene 218 (FIG. 3) of the operation panel section 102 (FIG. 1), and the step S1-1 is started.

Step S1-5

A log-in of user is allowed on the basis of an identification notification of identification controlling section 103 (FIG. 1), and the copy waiting scene 303 (FIG. 3) is displayed on the display scene 218 (FIG. 3) of the operation panel section 102 (FIG. 1). Then the flow is ended.

Figure 7:
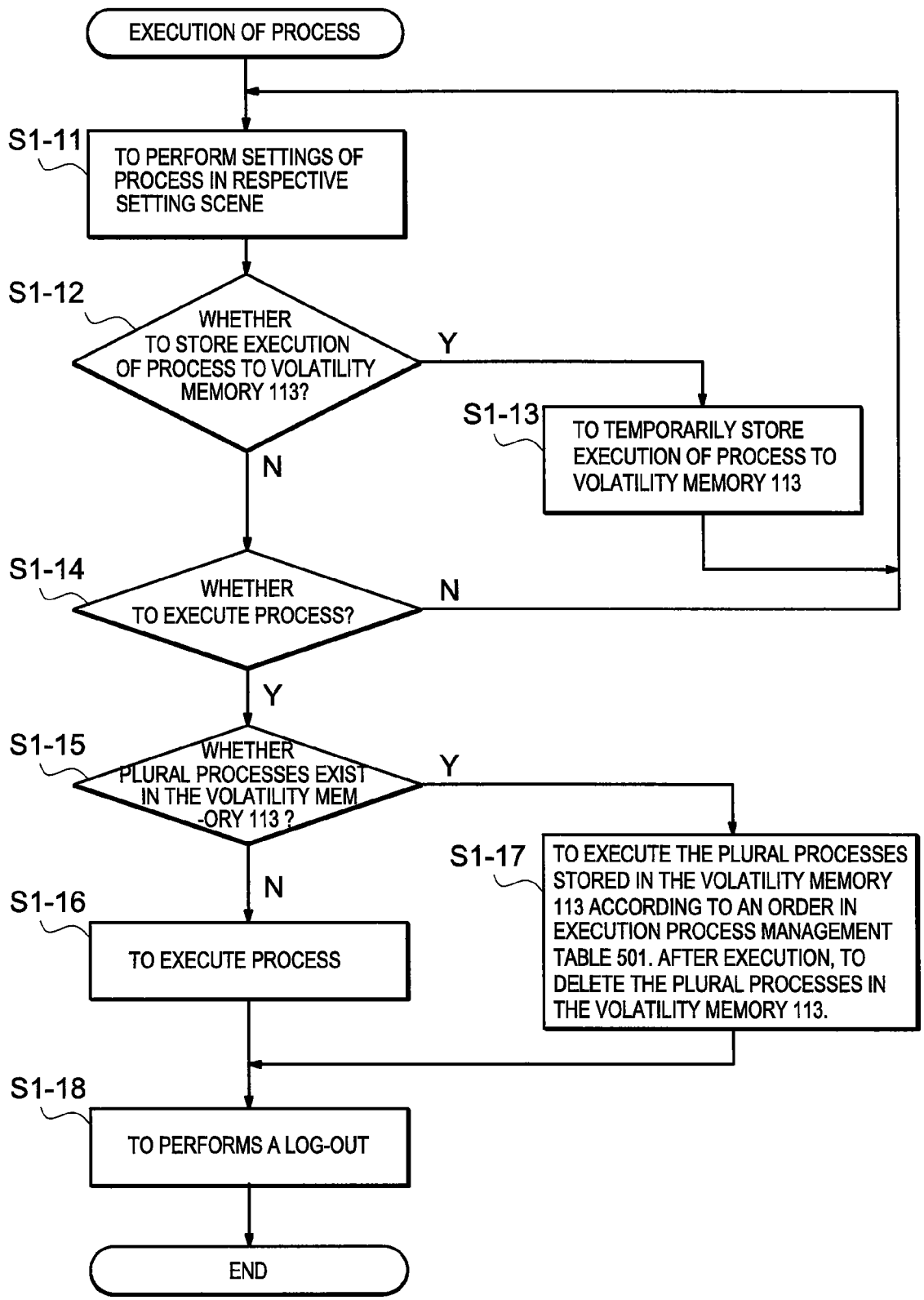
FIG. 7 is a flowchart for explaining an execution of process outputted from operation panel section in embodiment 1.

FIG. 7 is a flowchart for explaining an execution of process outputted from operation panel section in embodiment 1.

The flowchart shows execution operations of process request inputted by user through the operation panel section 102. Regarding the execution operations of inputted process request, they will be explained according to step order from Step S1-11~S1-18.

Step S1-11

For example, in the case that user wants to execute a copy in the multiple apparatus 101 (FIG. 1), when user presses the downward cursor key 215 (FIG. 2) in the scene 303 (copy waiting scene) of FIG. 3, the scene 306 (copy setting scene) is displayed. When user performs a setting of copy in the scene 306 (FIG. 3), a setting of process is executed by the process setting section 112 (FIG. 1).

Step S1-12

After the setting of process in the process setting section 112 (FIG. 1), when user presses the button 220 (FIG. 2), the scene 309 (process executing scene) is displayed. In the case that user selects "Put into cart" (to store the process request into the volatility memory 113) in the scene 309 (FIG. 3), the step S1-13 is started; in the case that user selects "Execute", the step S1-14 is started.

Step S1-13

The process storing section 107 (FIG. 1) temporarily stores the process request to the volatility memory 113 (FIG. 1), then the step S1-11 is started for waiting for an input of next process following later (i.e. the scene 303 is displayed again.).

Step S1-14

The scene 310 (process execution confirmation scene) is displayed. In the case that user selects "No" in the scene 310, the scene 303 (copy waiting scene) is displayed again, the step S1-11 is started. In the case that user selects "Yes" in the scene 310 (process execution confirmation scene), the step S1-15 is started.

Step S1-15

The process executing section 108 (FIG. 1) confirms whether plural processes are stored in the volatility memory 113 (FIG. 1) or not. In the case that plural processes are not stored in the volatility memory 113, the step S1-16 is started; in the case that plural processes are stored in the volatility memory 113, the step S1-17 is started;

Step S1-16

The process executing section 108 (FIG. 1) controls the print executing section 109 (FIG. 1) corresponding to the process specified by user, the scan executing section 110 (FIG. 1), or the facsimile executing section 111 (FIG. 1), and makes it execute process.

Step S1-17

The process executing section 108 (FIG. 1) controls the print executing section 109 (FIG. 1) corresponding to the process specified by user, the scan executing section 110 (FIG. 1), and the facsimile executing section 111 (FIG. 1), and makes them execute the plural processes stored in the volatility memory 113 in parallel, on the basis of the settings stored in the execution process management table 501. After processes ended, the process contents are deleted from the execution process management table 501.

Moreover, in the case that the process executing section 108 performs process on the basis of settings stored in the execution process management table 501, first, the process executing section 108 uses the scan executing section 110 to perform a read by only once scan and to temporarily store image data. In the case that process name "Scan" exists in the process setting of the execution process management table 501, according to the "Respective Settings of Scan" relative to the "Scan", the process executing section 108 outputs an instruction to send image data to specified place corresponding to operation of "Scan to Email", operation of "Scan to Memory", operation of "Scan to Server", or operation of "Scan to PC", and to store the image data so as to execute the operation.

Further, in the case that process name "Copy" exists in the process setting of the execution process management table 501, according to the "Respective Settings of Copy" relative to the "Copy", the process executing section 108 uses the print executing section 109 to process the temporarily stored image data and to perform a print output.

Furthermore, in the case that process name "Facsimile" exists in the process setting of the execution process management table 501, according to the "Respective Settings of Facsimile" relative to the "Facsimile", the process executing section 108 uses the facsimile executing section 111 to process the temporarily stored image data and to perform a facsimile communication process.

That is, the process executing section 108 uses the image data read by scan of one time to execute plural processes that are inputted after the previous identification of the code number and are stored in parallel with respect to copy, store of scan image data, and FAX communication.

Step S1-18

After execution of process, the log-in/log-out processing section 102a (FIG. 1) automatically logs out. Then the flow is ended.

Further, through an execution specification of user, a registration end is recognized, and a process is started together with logging out (after ended process, a log-out may be performed).

As stated above, according to the embodiment 1, it is possible to collectively execute plural processes and to shorten process time. Further, because a log-out is automatically performed after execution of process, after the process ended, it is impossible that other user except the identified user poses as the identified user to use the multiple apparatus.

<Embodiment 2>

Figure 8:
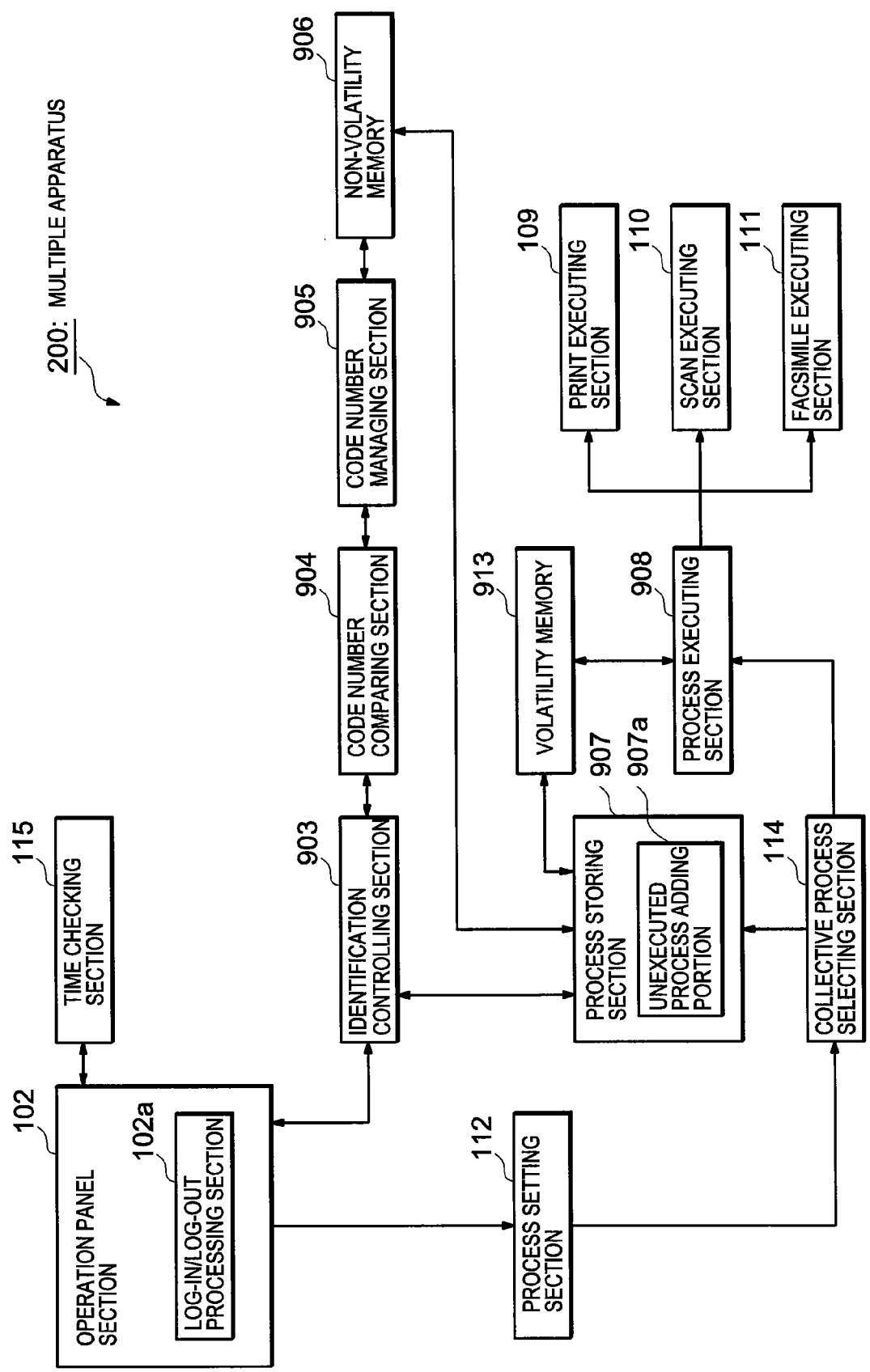
FIG. 8 is a block diagram showing a summary structure of an image forming apparatus (multiple apparatus) of embodiment 2.

FIG. 8 is a block diagram showing a summary structure of an image forming apparatus (multiple apparatus) of embodiment 2.

As shown by FIG. 8, a multiple apparatus 200 of embodiment 2 comprises an operation panel section 102, an identification controlling section 903, a code number comparing section 904, a code number managing section 905, a non-volatility memory 906, a process storing section 907, a process executing section 908, a print executing section 109, a scan executing section 110, a facsimile executing section 111, a process setting section 112, a volatility memory 913, a collective process selecting section 114 and a time measuring section 115.

Next is to only explain a part being different from the embodiment 1. Regarding the same part as the embodiment 1, it will be assigned the same symbol and its explanation will be omitted.

The identification controlling section 903 is a part to control the code number comparing section 904, the code number managing section 905 and the non-volatility memory 906 on the basis of a code number inputted by the user through the operation panel section 102; and to execute a user identification.

The code number comparing section 904 is a part to judge whether the code number inputted by the user corresponds to a registered code number read out from the non-volatility memory 906 via the code number managing section 905 or not, that is, is a part to judge whether the code number inputted by the user is included in a code number management table of the non-volatility memory 906.

The code number managing section 905 is a part to manage code numbers registered in the multiple apparatus 200. In the management, a new registration of identification number toward the non-volatility memory 906 and a read of the registered identification number from the non-volatility memory 906 are included.

The non-volatility memory 906 has a code number management table whose contents are different from that in embodiment 1 and it is a non-volatility memory to previously store code numbers via the code number managing section 905. Regarding the contents of the code number management table, later it will be explained once more.

The process storing section 907 has an unexecuted process adding portion 907a. In the case that a collective process is selected by user via the collective process selecting section 114, the process storing section 907 temporarily store plural process requests (print process, scan process, facsimile process and the like) of user to the volatility memory 913. Further, the process storing section 907 also is a part to read out process unexecuted last time from the code number management table of the non-volatility memory 906 and additionally store it.

Figure 9:
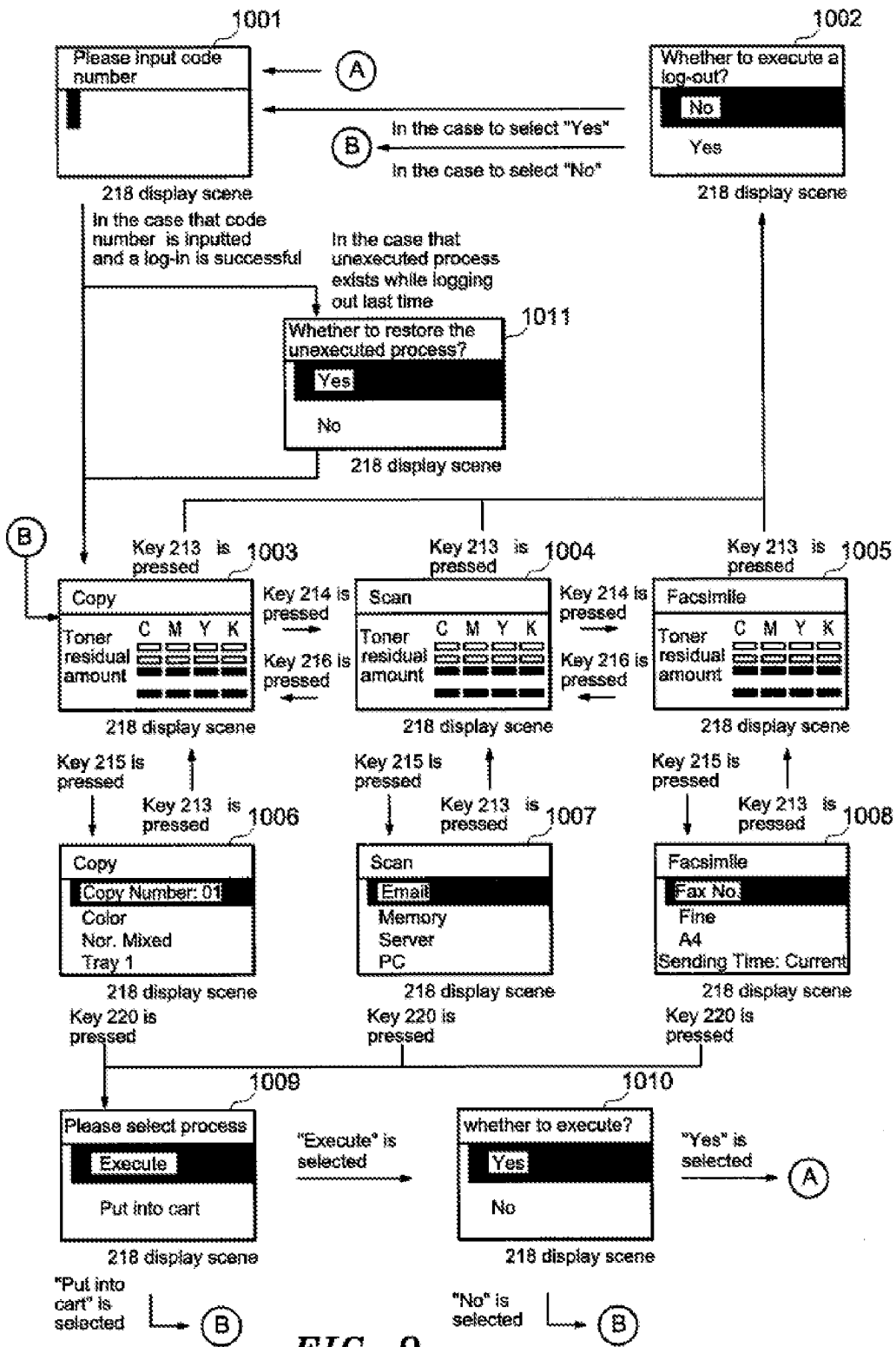
FIG. 9 is an explanation diagram showing a display scene of operation panel section in embodiment 2.

FIG. 9 is an explanation diagram showing a display scene of operation panel section in embodiment 2.

In the drawing, scenes 1001~1010 correspond to the scenes 301~310, and because they have the same functions, their explanations are omitted.

A scene 1011 is an unexecuted process restoring scene. It is displayed after logged out without executing the process user specified while logging in last time. When to restore the unexecuted process unexecuted while last log-in, "Yes" may be selected; and when not to restore the unexecuted process, "No" may be selected.

FIG. 10 is a diagram showing a code number management table of embodiment 2.

As shown by FIG. 10, code number consists of numerals of 4-9 digits the registration number of the code number may be optionally set by user.

The code number is written into the non-volatility memory 906 by the code number managing section 905 when registering the code number, and is read out from the non-volatility memory 906 when confirming the code number in the code number comparing section 904. Further, in the case that the user represented by code number makes a log-out perform without executing the specified process, the unexecuted process No. of execution process management table 1201 is assigned to the code number. Though requested plural processes, when user selected "Stop" on the way of executing, the residual process is stored in the non-volatility memory and a log-out is performed.

FIG. 11 is a diagram showing an execution process management table of embodiment 2.

As shown by FIG. 5, an execution process management table 1201 consists of a process No., a process name and a process setting. The process storing section 907 stores the unexecuted process specified by user to the non-volatility memory 913. Further, in the case that a log-out is performed without executing the process specified by user who is identified through inputting code number, the process storing section 907 assigns the unexecuted process No. in the execution process management table 1201 to the code number by making a relation, and reads out the process name and the process setting stored in the volatility memory 913 so as to make a relation of the process name, the process setting and the unexecuted process No., further stores the relation of the process name, the process setting and the unexecuted process No. to the non-volatility memory 906. Then, the process storing section 907 deletes the process name and the process setting from the volatility memory 913.

The following is to explain operations of the multiple apparatus 200 in embodiment 2.

Figure 12:
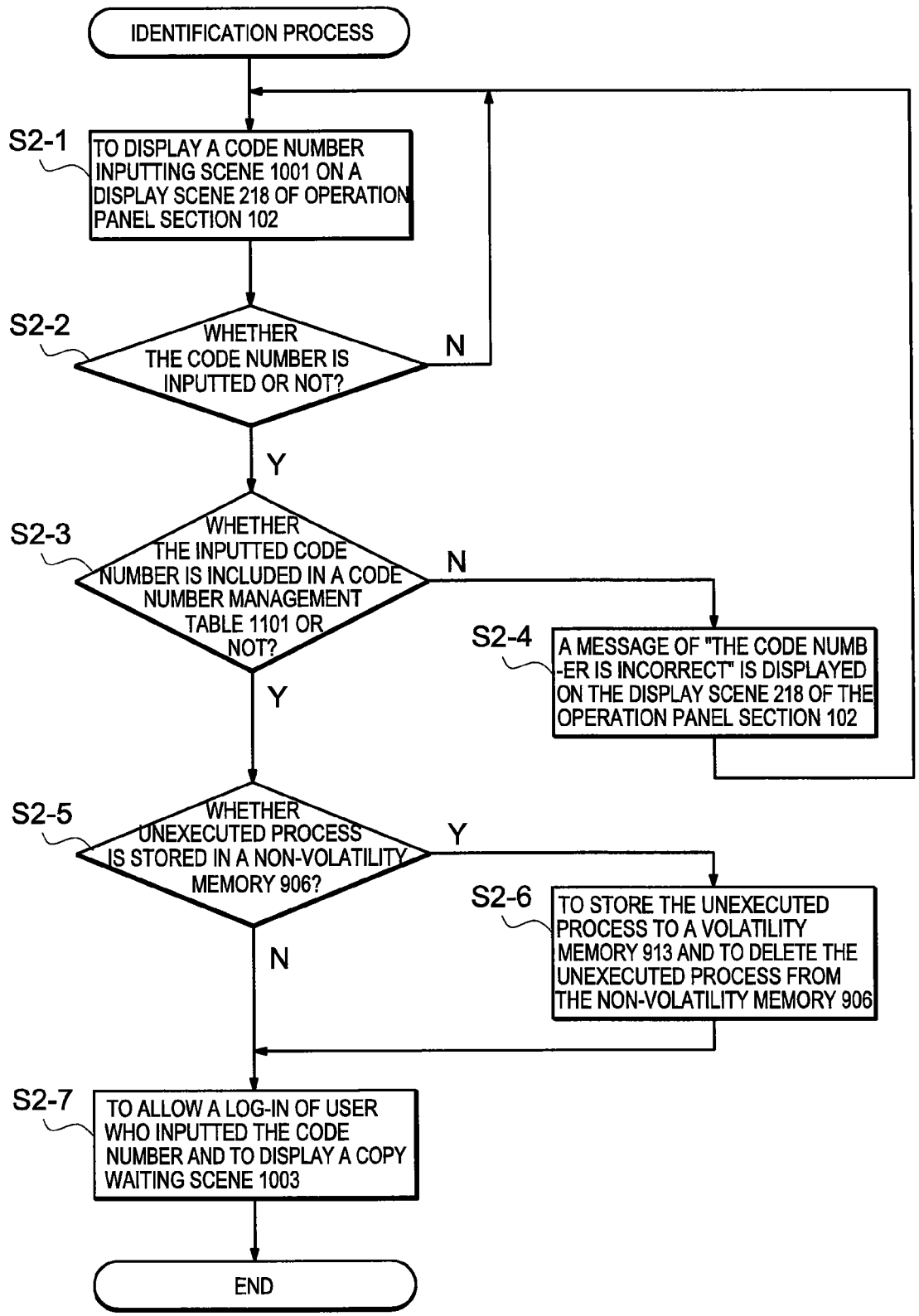
FIG. 12 is a flowchart for explaining an identification process using code number outputted from operation panel section in embodiment 1.

FIG. 12 is a flowchart for explaining an identification process using code number outputted from operation panel section in embodiment 2.

The flowchart shows operations when the identification controlling section 903 (FIG. 8) executes user identification on the basis of code number received from user via the operation panel section 102 (FIG. 8). Regarding the operations of the identification controlling section 903 (FIG. 8), they will be explained according to step order from Step S2-1~S2-7.

Step S2-1

The multiple apparatus 200 (FIG. 8) is protected by code number. On the display scene 218 (FIG. 9) of the operation panel section 102 (FIG. 8), the scene 1001 (code number inputting scene) is displayed.

Step S2-2

User uses the button 201, the button 202, the button 203, the button 204, the button 205, the button 206, the button 207, the button 208, the button 209 and the button 211 of the operation panel section 102 (FIG. 2) to input the code number in the scene 1001 (FIG. 9), and decides the code number by using the Enter key 217. Until the input of the code number ends, the step S2-1~2-2 are repeated. When the input of the code number ended, the step S2-3 is started.

Step S2-3

The identification controlling section 903 (FIG. 8) controls the code number comparing section 904 (FIG. 8), the code number managing section 905 (FIG. 8) and the non-volatility memory 906 (FIG. 8) to execute a user identification on the basis of the code number inputted by the user through the operation panel section 102 (FIG. 8). The code number comparing section 904 (FIG. 8) judges whether the code number inputted by the user is included in a code number management table (FIG. 10) of the non-volatility memory 906 or not. If it is included, the step S2-5 is started; if it is not included, the step 2-4 is started.

Step S2-4

On the display scene 218 (FIG. 9) of the operation panel section 102 (FIG. 8), a message such as "the code number is incorrect" is displayed. Then, the scene 1001 (code number inputting scene) is displayed once more on the display scene 218 (FIG. 9) of the operation panel section 102 (FIG. 8), and the step S2-1 is started.

Step S2-5

The identification controlling section 903 (FIG. 8) makes the process storing section 907 (FIG. 8) confirm whether unexecuted process specified by the identified user when logging in last time exists in the non-volatility memory 906 (FIG. 8) or not. If the unexecuted process specified by the identified user when logging in last time exists in the non-volatility memory 906, the step S2-6 is started; and if the unexecuted process does not exist in the non-volatility memory 906, the step S2-7 is started.

Step S2-6

The process storing section 907 (FIG. 8) reads out the unexecuted process which is specified by the identified user when logging in last time and corresponds to the unexecuted process No. assigned to the code number from the non-volatility memory 906, and stores it to the volatility memory 913, further deletes the process name and the process setting corresponding to the unexecuted process No. from the non-volatility memory 906.

Step S2-7

A log-in of user is allowed on the basis of an identification notification of identification controlling section 903 (FIG. 8), and the copy waiting scene 1003 (FIG. 9) is displayed on the display scene 218 (FIG. 9) of the operation panel section 102 (FIG. 8). Then the flow is ended.

Moreover, because the flow showing the execution of process outputted from the operation panel section in the embodiment 2 is the same as the flow (FIG. 7) showing the execution of process outputted from the operation panel section in embodiment 1, so its explanation is omitted.

As stated above, according to the embodiment 2, in the case that plural process request specified by user are not executed, these unexecuted processes can be restored when next log-in is performed. Therefore, even if logged out without executing process by mistake, or even if automatically logged out due to predetermined time-out without executing process, it is possible to continue the process.

The utilization possibility on industry:

In the stated above embodiments, the multiple apparatus is explained as an image forming apparatus, but the present invention, is also can be applied to other apparatus such as facsimile apparatus, copying apparatus and the like.

Further, in the stated above embodiments, such structure to individually identify through a password inputted from an inputting section of user discrimination information is used, but the present invention also may be applied to such structure to identify through anyone of a fingerprint data, iris data, face outline data, vein data, and voice data, as individual discrimination information.

Furthermore, through combining plural individual discrimination information such as these data, it is possible to improve security ability.

The present invention is not limited to the foregoing embodiments but many modifications and variations are possible within the spirit and scope of the appended claims of the invention.

What is claimed is:

1. An image forming apparatus which performs a log-in through an identification with respect to a user, comprising:
   a non-volatility memory which previously stores discrimination information of the user as registration discrimination information;
   a discrimination information obtaining section which obtains an identified discrimination information from the user;
   an identifying section which compares the identified discrimination information and the registration discrimination information to determine whether the identification is authenticated;
   a log-in section which logs in for the user when the identification is authenticated;
   an inputting section which receives a process request input by the user after a log-in of the user;
   a process executing section which executes the process request from the inputting section, the requested process being one of a print process, a scan process, or a facsimile process; and
   a log-out processing section which logs out following an end of the input of the process request,
   wherein the process executing section starts the requested print process, scan process, or facsimile process simultaneously with logging out of the currently logged-in user by the log-out processing section in response to the logged-in user selecting a process execution confirmation for executing the requested process.

2. The image forming apparatus according to claim 1, wherein the discrimination information is a password.

3. The image forming apparatus according to claim 1, further comprising:
   a memorizing section which memorizes plural image data requested by plural users,
   wherein the process executing section executes a parallel process of a portion of the plural image data requested by the logged-in user.

4. The image forming apparatus according to claim 3, further comprising:
   a collective process selecting section which selects the parallel process of the portion of the plural image data requested by user or a single process of predetermined image data.

5. The image forming apparatus according to claim 3, wherein the memorizing section further has an unexecuted process adding function to additionally add process unexecuted last time.

6. An image forming apparatus for performing one or a plurality of processes on an image, comprising:
   a volatility memory;
   an identifying section which executes an identification of a user;
   a log-in section which logs in for the user when the user is authenticated by the identifying section;
   a process inputting section which receives an input of a single process or a plurality of individually specified processes after a log-in of the user;
   a process managing section which, when the user designates the plurality of processes, stores to the volatility memory the plurality of processes inputted by the process inputting section and to store to the volatility memory one or more unexecuted processes specified by the identified user when logging in last time upon determining that the one or more unexecuted processes exist;
   a process executing section which, when the user designates the plurality of processes, collectively executes the plurality of processes of the process managing section, each of the plurality of processes being one of a print process, a scan process, or a facsimile process, at least one of the designated processes being a different process than other ones of the designated plurality of processes; and
   a log-out processing section which, when the user designates the plurality of processes, logs out automatically after collective execution of the plurality of processes is completed,
   wherein the identifying section, before execution of the plurality of processes stored in the process managing section is completed, prevents authentication by other users and prevents input to the process inputting section.

7. The image forming apparatus according to claim 6, further comprising a display screen.

8. The image forming apparatus according to claim 7, wherein the display screen displays a previously unexecuted process following a log-in.

9. The image forming apparatus according to claim 7, wherein the identification information is a password, and the display screen displays characters of the password as identical symbols.

10. The image forming apparatus according to claim 6, wherein the process executing section collectively executes the plurality of processes in a designated order.

* * * * *